United States Patent
Costa-Requena et al.

(10) Patent No.: US 7,028,101 B2
(45) Date of Patent: Apr. 11, 2006

(54) OPTIMAL LOCATION SERVICE FOR MANAGING NEXT HOP ADDRESSING FOR MESSAGES ASSOCIATED WITH MULTIPLE ADDRESS SCHEMES

(75) Inventors: Jose Costa-Requena, Helsinki (FI); Jyrki Aarnos, Kangasala (FI); Ilkka Westman, Helsinki (FI); Hisham Khartabil, Helsinki (FI)

(73) Assignee: Nokia Corporation, Espoo (FI)

( * ) Notice: Subject to any disclaimer, the term of this patent is extended or adjusted under 35 U.S.C. 154(b) by 101 days.

(21) Appl. No.: 10/396,123

(22) Filed: Mar. 25, 2003

(65) Prior Publication Data

US 2004/0193725 A1   Sep. 30, 2004

(51) Int. Cl.
    *G06F 13/00* (2006.01)
(52) U.S. Cl. ..................................... 709/245
(58) Field of Classification Search ............. 370/351, 370/352, 389, 392; 709/238, 245
    See application file for complete search history.

(56) References Cited

U.S. PATENT DOCUMENTS 6,584,093 B1 * 6/2003 Salama et al. .............. 370/351
6,654,606 B1 * 11/2003 Foti et al. ................... 370/392
6,741,585 B1 * 5/2004 Munoz et al. ............... 370/352

OTHER PUBLICATIONS

J. Rosenberg, H. Schulzrinne, G. Camarillo, A. Johnston, J. Peterson, R. Sparks, M. Handley and E. Schooler, *SIP: Session Initiation Protocol*, pp. 1-252, Jun. 2002.

* cited by examiner

Primary Examiner—Robert B. Harrell
(74) Attorney, Agent, or Firm—Hollingsworth & Funk, LLC (57) ABSTRACT

A system and method for managing next hop addressing where multiple address schemes are provided in messages transmitted via a network. A predefined addressing policy may be applied to an incoming message if the predefined addressing policy includes a policy corresponding to an incoming address scheme of the incoming message. The incoming address scheme is converted to one or more outgoing address schemes provided by a location service in response to a location query. A plurality of outgoing messages is dispatched, each using one of the outgoing address schemes provided by the location service. A default next hop addressing operation is effected when the predetermined addressing policy does not correspond to the incoming address and when none of the multiple outgoing address schemes provides a useful result.

38 Claims, 8 Drawing Sheets

OPTIMAL LOCATION SERVICE FOR MANAGING NEXT HOP ADDRESSING FOR MESSAGES ASSOCIATED WITH MULTIPLE ADDRESS SCHEMES

FIELD OF THE INVENTION

This invention relates in general to network communications, and more particularly to a manner of managing next hop addressing where multiple address schemes are provided in messages transmitted via a network.

BACKGROUND OF THE INVENTION

While computers are still used for their traditional processing purposes, advances in communication infrastructures and protocols have turned standard computing devices into valuable communication tools. Computers communicate with each other, and with other electronic devices, over networks ranging from Local Area Networks (LANs) to wide reaching Global Area Networks (GANs) such as the Internet. Other electronic devices have experienced similar transformations, such as mobile phones, Personal Digital Assistants (PDAs), and the like. Today, these wireless devices are being used for a variety of different types of communication. For example, current and anticipated mobile phone technologies have transformed these wireless devices into powerful communication tools capable of communicating voice, data, images, video, and other multimedia content. PDAs, once the portable calendaring and organizational tool, now often include network communication capabilities such as e-mail, Internet access, etc. With the integration of wireless and landline network infrastructures, a multitude of new services are arising, and various information types can be conveniently communicated between wireless and/or landline terminals.

In many cases, new networks and network protocols are being developed to facilitate the new network services. For example, the Universal Mobile Telecommunications System (UMTS) represents an evolution from today's second generation (2G) mobile networks, and is a key concept in third generation (3G) mobile technologies. One particular protocol that may be used in connection with networks such as UMTS networks to provide various new services is the Session Initiation Protocol (SIP). SIP is an application-layer signaling protocol for creating, modifying, and terminating sessions with one or more participants. It can be used in applications such as Internet conferencing, telephony, presence, events notification, instant messaging, and the like.

In routing SIP messages through a UMTS or other SIP-enabled network, location services such as DNS or ENUM are typically using DNS or ENUM queries for obtaining the address of the next hop SIP server. This function is often implemented in the Serving-CSCF (S-CSCF) according to 3GPP terminology and specifications. Once-the message is forwarded to the next hop in the destination network, the message is sent to the Interrogating-CSCF (I-CSCF) that will take care of finding where the user is located within the local domain. However, SIP and other protocols may support multiple address schemes to be included in the messages, such as SIP, secure SIP, telephony, instant messaging, presence, etc. The determination of which hop is the next hop in the transmission of the message may be difficult, particularly where the location service provided multiple possible address schemes in response to a query, or where the location service fails to provide any useful response.

Accordingly, there is a need in the network communication industry for a manner of managing next hop addressing where multiple address schemes are provided in messages transmitted via a network. The present invention fulfills these and other needs, and offers other advantages over the prior art approaches.

SUMMARY OF THE INVENTION

To overcome limitations in the prior art described above, and to overcome other limitations that will become apparent upon reading and understanding the present specification, the present invention discloses a system, apparatus and method for managing next hop addressing where multiple address schemes are provided in messages transmitted via a network, where the address of the next hop is determined independently of the address scheme included in the message, and where mechanisms are employed to manage multiple address scheme responses from next hop location servers and situations where no useable response is provided by the next hop location servers.

In accordance with one embodiment of the invention, a method is provided for performing next hop addressing for messages sent from source devices to destination devices over a network. The method includes receiving at least one incoming message from a source device targeted for a destination device, and identifying an associated incoming address scheme of the incoming message. A predefined addressing policy is applied to the incoming message if the predefined addressing policy includes a policy corresponding to the incoming address scheme. If the predefined addressing policy does not include a policy for the incoming address scheme, a location query is dispatched to a location service, the incoming address scheme is converted to one or more outgoing address schemes provided by the location service in response to the location query, and one or more outgoing messages are dispatched using the outgoing address schemes provided by the location service.

In accordance with more particular embodiments of such a method, a default operation may be effected where the location service fails to provide information capable of converting the incoming address scheme to the outgoing address scheme. This default operation may be selected from multiple default operations, depending on the incoming address scheme of the incoming message. In such case, the default action may involve forwarding the incoming message to a network element selected in response to the incoming address scheme of the incoming message. In other particular embodiments, the default action may include querying a different location service than the location service originally queried, converting the incoming address scheme to a predetermined outgoing address scheme, forwarding the incoming message to a predefined local gateway, identifying a network entity in which to forward the incoming message for handing and forwarding the incoming message to the identified network entity, returning an error message to the source device, etc. In another particular embodiment, dispatching of the location query includes dispatching at least a domain of an address of the incoming message, and the default operation is effected where no address information for the domain is received in response to the dispatching of the one or more outgoing messages.

In accordance with other particular embodiments of such a method, the location service provides multiple outgoing address schemes in response to the location query. The incoming address scheme is converted to the multiple outgoing address schemes by creating a plurality of the outgoing messages using each of the outgoing address schemes provided by the location service. The dispatching of the multiple outgoing messages includes concurrently dispatching the multiple outgoing messages to one or more destinations provided by the location service in response to the location query. In other embodiments, the multiple outgoing messages are sequentially dispatched rather than concurrently dispatched. In such case, the outgoing messages may be dispatched until a successful acknowledgement is received from the destination device, or until the outgoing address schemes have been exhausted.

In accordance with another embodiment of the invention, a method is provided for performing next hop addressing for Session Initiation Protocol (SIP) messages sent from source devices to destination devices over a SIP-enabled network. The method includes applying a predefined addressing policy to an incoming SIP message if the predefined addressing policy includes a policy corresponding to an incoming address scheme. The incoming address scheme is converted to multiple outgoing address schemes provided by a location service in response to a location query. A plurality of outgoing messages is dispatched, each using one of the outgoing address schemes provided by the location service. A default next hop addressing operation is effected when the predetermined addressing policy does not correspond to the incoming address and when none of the multiple outgoing address schemes provides a successful result.

In accordance with another embodiment of the invention, an optimal location server is provided for use in determining next hop addresses for messages transmitted over a network using a data session negotiation protocol. The optimal location server includes an address scheme determination module configured to parse an incoming address scheme from an address contained within an incoming message. A policy management module is configured to apply a predefined addressing policy to the incoming message if the predefined addressing policy includes a policy corresponding to the incoming address scheme. A location service query generation module is configured to create and dispatch a location query to a location service assisting the optimal location server in performing its functionality. An address conversion module is configured to convert the incoming address scheme to one or more outgoing address schemes provided by the location service in response to the location query and to generate outgoing messages for each respective outgoing address scheme. A default action module is configured to effect a fallback next hop addressing operation when neither the policy management module nor the address conversion module successfully provide the next hop address for the incoming message.

In accordance with another embodiment of the invention, a terminal, such as a mobile or landline terminal, is provided for transmitting messages over a network using Session Initiation Protocol (SIP). The terminal includes an optimal location service for use in determining next hop addresses for the messages to be transmitted. The optimal location service includes an address scheme determination module configured to identify a message address scheme from an address contained within a message to be transmitted. A policy management module is configured to apply a predefined addressing policy to the message if the predefined addressing policy includes a policy corresponding to the message address scheme. An address conversion module is configured to convert the message address scheme to one or more outgoing address schemes provided by a location service in response to a SIP proxy location query, and to generate outgoing messages for each respective outgoing address scheme. A default action module is configured to effect a default next hop addressing operation when neither the policy management module nor the address conversion module successfully provide the next hop address for the message to be transmitted.

In accordance with another embodiment of the invention, a computer-readable medium is provided having instructions stored thereon that are executable by a computer system for performing next hop addressing for messages sent from source devices to destination devices over a network. The instructions perform steps including applying a predefined addressing policy to an incoming message if the predefined addressing policy includes a policy corresponding to an incoming address scheme. The instructions perform steps including converting the incoming address scheme to multiple outgoing address schemes provided by a location service in response to a location query, and dispatching a plurality of outgoing messages each using one of the outgoing address schemes provided by the location service. A default next hop addressing operation is effected when the predetermined addressing policy does not correspond to the incoming address and when none of the multiple outgoing address schemes provides a next hop address for the incoming message.

In accordance with another embodiment of the invention, a network is provided that includes a location server and an optimal location server. The location server is configured to return next hop addresses and corresponding next hop address schemes in response to receipt of a location service query. The optimal location server is used to determine the next hop address for a message to be transmitted over the network using a data session negotiation protocol (e.g., SIP). The optimal location server includes an address scheme determination module configured to parse an incoming address scheme from an address contained within an incoming message. A policy management module is configured to apply a predefined addressing policy to the incoming message if the predefined addressing policy includes a policy corresponding to the incoming address scheme. The optimal location server also includes a location service query generation module configured to create and dispatch a location query to the location server. An address conversion module is configured to convert the incoming address scheme to one or more outgoing address schemes provided by the location server in response to the location query, and to generate outgoing messages for each respective outgoing address scheme. A default action module is configured to effect a fallback next hop addressing operation when neither the policy management module nor the address conversion module successfully provide the next hop address for the incoming message.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described particular examples of implementations in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a system, apparatus, and method for providing optimal user location functionality for protocols that support multiple address schemes in the messages. In order to provide interoperability with the various address schemes, an optimal location functionality is provided that determines the address of the next hop independently of the address scheme included in the message, where a fallback mechanism based on location functionality logic may be activated if it fails to find the next hop. The invention involves ascertaining the incoming message address scheme, changing the address scheme for outgoing messages based on a response from a domain information database such as a DNS server, and possibly implementing default mechanisms in the event that the DNS server (or other standard or proprietary mechanisms that can alternatively be selected based on the information included in the address or on predefined location functionality logic) does not provide sufficient information to perform the appropriate address scheme conversion. It should be noted that while DNS, ENUM (e.164 numbers), and other standard services are often referred to herein for purposes of facilitating an understanding of the invention, the present invention is applicable to other similar standard or proprietary services.

A session initiation protocol as used herein generally refers to a protocol that negotiates data sessions between devices. A currently defined instantiation of a session initiation protocol has been defined Internet Engineering Task Force (IETF), and is referred to as the Session Initiation Protocol (SIP). SIP is standard signaling protocol that operates at the application layer of the Open Systems Interconnection (OSI) networking model. Although the present invention is described in terms of SIP as defined by IETF, it is appreciated that concepts according to the present invention can be implemented using variations of the SIP standard as well as other analogous forms of session initiation, streaming and data manipulation protocols.

SIP is an application-layer signaling protocol for creating, modifying, and terminating sessions with one or more participants. It can be used in applications such as Internet conferencing, telephony, presence, events notification, instant messaging, and the like. SIP enables network endpoints or "user agents" to discover one another and to agree on a session characterization. In order to locate other users, SIP utilizes an infrastructure of network proxy servers to which users can send registrations, invitations to sessions, and other requests via their terminals. SIP supports various aspects of establishing and terminating sessions, such as user availability, session setup such as ringing, session management, and some limited terminal capabilities.

The primary elements of a SIP network include user agents, servers, and databases or "location servers." User agents (UA) refer to the network endpoints that initiate SIP requests to establish media sessions, and to transmit/receive information. Servers generally refer to the network elements that are located within the SIP-enabled network that operate as intermediary devices. The servers, including SIP proxies, redirect servers, and registrar servers, assist in establishing sessions and other functions. SIP proxies generally receive SIP requests from user agents or other proxies, and forward the requests to other locations. Redirect servers provide redirection responses in response to a request necessitating a request retry. Registrar servers handle SIP registration requests and maintain user agent information in databases, such as location servers. These databases/location servers include information such as Uniform Resource Locators (URLs), IP addresses, preferences, routing information, and the like.

In a communications network, a number of basic functions are provided. In the context of SIP-enabled networks, these basic functions include address resolution, session-related functions, and non-session-related functions. The present invention is primarily related to address resolution in SIP-enabled networks, and obtaining the address of the next hop in the path (e.g. next signaling server, gateway, application server, etc.) in order to forward the message toward the destination end point. Address resolution generally refers to resolving differences between computer addressing schemes, so that information may be communicated between the appropriate sources/destinations. The address resolution process may involve multiple SIP message hops, which allows UAs and proxies to route requests on a hop-by-hop basis. The proxies consult with location servers or local databases, for example, to obtain information to modify the request Uniform Resource Indicator (URI), and then forward the request to the next hop. This continues at each intermediary node until the request reaches its targeted destination.

Currently, location services are often implemented using the Domain Name Service (DNS) and DNS-based ENUM queries for obtaining the address of the next hop SIP server.

ENUM generally refers to a DNS-based architecture and protocol (IETF RFC 2916) by which an E.164 number, as defined in ITU Recommendation E.164, can be expressed as a Fully Qualified Domain Name (FQDN) in a specific Internet infrastructure domain defined for this purpose (e164.arpa). More particularly, E.164 numbers are unique identifiers for resources on public telecommunication networks that can support various services and protocols, and are used to identify phones, fax machines, pagers, data modems, email clients, etc. The result of an ENUM query is a series of resource records that can be used to contact a resource (e.g.URI) associated with that number. DNS queries refer to queries to the DNS that translates domain names into network addresses.

According to existing 3rd Generation Partnership Project (3GPP) terminology and specifications, these current DNS/ENUM queries are typically implemented in the Serving Call State Control Function (S-CSCF) or in an equivalent SIP proxy server(s) in SIP-based networks. Once the message is forwarded to the next hop in the destination network, the message is sent to the Interrogating CSCF (I-CSCF) that finds where the target user is located within the local domain.

However, SIP supports multiple address schemes to be included with the messages. For example, these address schemas include without limitation "sip:" (SIP), "sips:" (secure SIP), "tel:" (telephony), "wv:" (Wireless Village), "im:" (instant message), "pres:" (presence), etc. For example, a SIP URL is used within SIP messages to indicate the originator of the message (i.e., "From"), the current destination (i.e., "Request-URI"), the final recipient (i.e., "To"), and the redirection address ("Contact"). A SIP URL includes a "sip:" indicator. As another example, telephony URL schemas specify "tel:", "fax:", "modem:", or other locations of a terminal in the network. The "pres:" represents a presence URI. As can be seen, multiple address schemas are included with messages received at a server.

Figure 1:
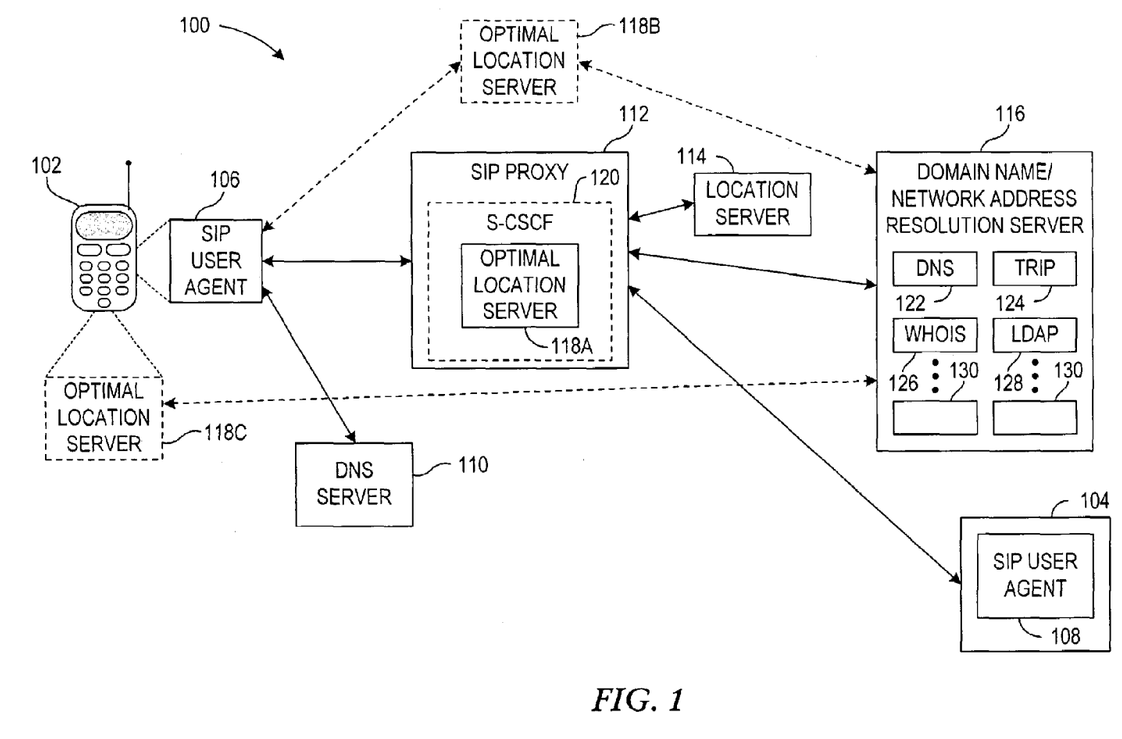
FIG. 1 is a block diagram illustrating a SIP-enabled network incorporating the principles of the present invention.

In accordance with the present invention, an Optimal Location Server (OLS) is provided that determines the address of the next hop independently of the address scheme included in the SIP message. In this manner, interoperability is provided with all such address schemes. FIG. 1 is a block diagram illustrating a SIP-enabled network 100 incorporating the principles of the present invention. In the illustrated embodiment, a plurality of SIP-enabled terminals 102, 104 are provided. Such terminals may include wireless devices as well as devices operating via landline networks. In the illustrated embodiment, a first terminal 102 is represented as a wireless device—a mobile phone in the illustrated embodiment—but may also represent a Personal Digital Assistant (PDA), portable computing device such as a wireless laptop computer, etc.

Associated with each of the SIP-enabled terminals 102, 104 is a SIP user agent (UA) 106, 108 respectively. The UA 106, 108 serves at least to initiate SIP requests to establish media sessions and to transmit/receive information. A SIP UA 106 desiring to send a message to another UA such as UA 108 may consult with a domain name/network address resolution server such as DNS server 110. For example, the SIP UA 106 may perform a request for a DNS Service record (e.g., DNS SRV query) to locate the SIP proxy server 112 for the domain associated with the destination UA 108. The request may then be sent to the address of the proxy 112 which may consult a location service 114. The location service 114 in turn locates the current registration URL for the terminal 104. The appropriate query, such as a DNS/ENUM query, may then be sent to the domain name/network address resolution server 116 to find the corresponding network address of the terminal 104. When the proxy 112 receives this network address (e.g., NAPTR record), the proxy 112 may forward the request to the terminal 104 using this network address.

In accordance with the present invention, optimal user location functionality is provided in the SIP-enabled network 100. As indicated above, SIP supports multiple address schemes to be included with the messages. In order to provide interoperability with all of these address schemes, the present invention provides at least one Optimal Location Server (OLS) that determines the address of the next hop independently of the address scheme included in the SIP message. If none is found, the OLS includes a predefined location functionality that defines a fallback mechanism in order to handle the routing of the message toward a best-effort hop. For example, the fallback mechanism may be implementation-specific or operator-specific, where the logic may be defined such that if the available location services fail an error response is sent to terminal, or if the available location services fail then keep the message and forward to the next hop indicated in domain part. In one embodiment of the invention, the OLS functionality 118A is implemented at the SIP proxy 112 for performing the appropriate searching, address scheme conversion, and designation of a default address scheme where necessary. In another embodiment, the SIP proxy 112 is represented by an S-CSCF 120, wherein the OLS 118A is associated therewith. Alternatively, the OLS 118B may be separately located or associated with another network element. In still another embodiment, a lighter version of the OLS functionality may be implemented at the terminal 102 itself, as represented by the OLS 118C.

In each case, the OLS 118 (including 118A, 118B, and/or 118C) will handle multiple address schemes associated with a received SIP, Real Time Streaming Protocol (RTSP), Common Profile for Instant Messaging (CPIM) compliant protocol message (or other similar/analogous protocol message). The OLS 118A, for example, will receive the SIP message, strip off the address and determine the address scheme. Based on that scheme, the OLS 118A will create the appropriate domain name query using the domain name portion of the address. For example, in the case where the domain name/network address resolution server 116 is a DNS 122, a DNS query is created using the domain portion of the address. Any type of domain name/address resolution services may be implemented in accordance with the present invention, including DNS 122, Telephony Routing over IP (TRIP) 124, "whois" 126, Lightweight Directory Access Protocol (LDAP) 128, or other similar service 130. These other services 130 may include, for example, proprietary mechanisms such as local databases, gateway location services, and the like.

If the response of the location service 1 16 succeeds, then the OLS 118A will perform the appropriate address modification based on the information received in the response. For example, if a DNS query were requesting the entry point of "abcxyz.com" for an instant messaging address scheme "im," and the response indicated "server1.abcxyz.com" and "sip," then the OLS 118A functionality will change the incoming "im:" scheme into the outgoing "sip:" scheme, and the message is sent to "server1.abcxyz.com."

Thus, one embodiment of the invention provides location server functionality at the OLS 118A, where this location server functionality handles the querying of multiple location services available for obtaining the potential next hop address candidates. Thus, the location server functionality will receive an order from the OLS 118A to obtain addresses for a particular address scheme/address (e.g., im: name@domain.com). The location server functionality will determine what are the available location services such as DNS, LDAP, whois+, etc., and will then create multiple location queries to each of them. The location server functionality will receive the response from each of those location services and will pass it on to the OLS 118A which will in turn apply an operator or other predetermined policy or will perform the appropriate address conversion to select the appropriate address for the next hop.

The OLS functionality 118 in accordance with the present invention therefore handles the situation where the response from the destination network DNS server 122 or other such service 116 returns multiple address schemes for the particular incoming address scheme. For example, a DNS query for "im:" may result in multiple address schemes being returned by a DNS 122, such as a plurality of "sip:", "wv:", "aol:", etc. In this case, the OLS 118 in accordance with one embodiment of the invention will send multiple messages with the different address schemes returned via the DNS server 122. Thus, the OLS 118 will manage sending of the same message with the different possible address schemes in case some of the multiple messages fail, and may do so until at least one succeeds or all of them fail. In one embodiment of the invention, the same message will be sequentially resent using different address schemes returned by the DNS server 122. In other embodiments, some or all of such multiple messages may be sent concurrently. Thus, the multiple messages may be sent by the OLS sequentially, concurrently, or some combination thereof.

In accordance with one embodiment of the invention, the OLS functionality 118 includes a default or "fallback" mechanism in the event that the destination network did not include the information in the DNS server for the particular domain. More particularly, in case all of the messages fail, the OLS should include location functionality logic that establishes a fallback mechanism configured statically as part of the implementation, or dynamically based on operator preferences. Thus, the OLS 118 may include certain configuration information that will indicate to which network entity the message should be directed for proper handling. Various examples of such a fallback situation are described more fully below.

Figure 2:
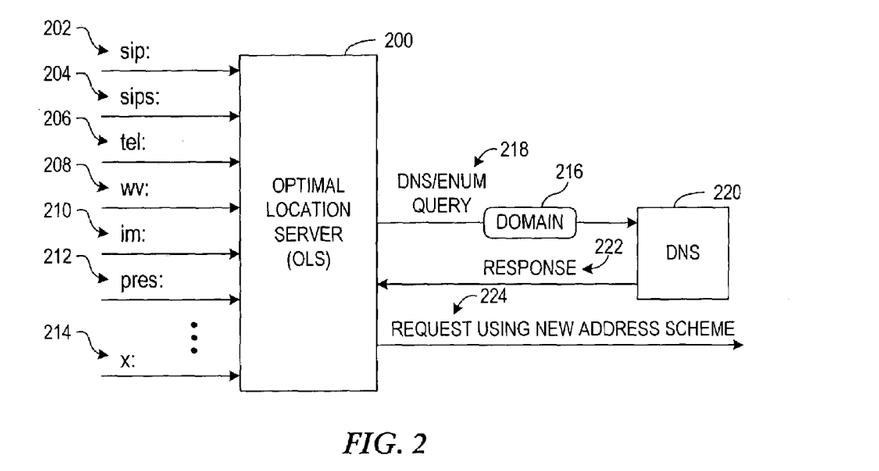
FIG. 2 is a block diagram illustrating one embodiment in which an OLS in accordance with the present invention can convert an address scheme into one that can be routed with the existing network.

FIG. 2 is a block diagram illustrating one embodiment in which an OLS 200 in accordance with the present invention can convert an address scheme into one that can be routed with the existing network. A number of representative incoming address schemes associated with a SIP message are shown. These representative schemes are illustrated for purposes of example, and do not represent an exclusive list of the types of address schemes that the OLS may convert. Rather, the present invention is applicable with any current or future address scheme that may be associated with a SIP (or analogous) message in the network. The representative address schemes include a SIP URI (sip:) 202, secure SIP (sips:) 204, telephony (tel:) 206, Wireless Village (wv:) 208, instant message (im:) 210, presence (pres:) 212, or any other appropriate address scheme (x:) 214.

With the help of the DNS server or other such address resolution module, the OLS 200 can convert the address scheme into one that can be routed within the existing network. The OLS 200 may have a predefined operator policy that will apply before using any of the available location services such as DNS, ENUM or others. For example, if the operator(s) has a predefined a table lookup with well-known address schemes and the address of the next hop for each of them, messages arriving with "im:" may be forwarded to a CPIM Gateway, messages arriving with "wv:" may be forwarded to a WV Gateway, messages arriving with "aol:" may be forwarded to AOL Gateway, and so forth.

After executing this location functionality logic and making such determinations, the OLS 200 may utilize other existing location services such as DNS or others, and will route the message based on the response of those services. Thus, if the local network only supports "sip:" schemes, the OLS 200 should convert any other schemes into "sip:". This is determined by obtaining the domain name portion of the address at the OLS 200 and providing the domain name 216 in connection with a DNS/ENUM (or other) query 218 to the DNS server 220. The DNS server 220 will return 222 the "sip:" scheme if that is the scheme supported by the local network, in which case the request 224 can be sent to the destination using the new address scheme. In this manner, the OLS 200 determines the address of the next hop independently of the address scheme included in the incoming SIP message. Moreover, the OLS may include predefined logic to accommodate situations where multiple options are returned by the DNS or other available location servers. Thus, in case one of the options matches a predefined logic established in the OLS server (e.g. operator established that all messages with "wv:" address scheme should be routed through a local Wireless Village Gateway) the OLS 200 will return that predefined selection and the proxy will utilize the specific hit.

If it is not possible to convert to the local network scheme, the OLS 200 can return a lookup error to the source terminal. In the case of such a lookup error, the OLS 200 functionality includes a network or operator specific policy for the address conversion. In other cases it may be required that the operator explicitly indicates that all messages with a certain address scheme should be routed through a particular network element. For example, the operator may explicitly indicate that all messages with a "wv:" scheme be routed through a local gateway. In this case the OLS 200 would not need to utilize the DNS 220 for converting the scheme into another protocol scheme. However, when the message is forwarded to the local "WV gateway," the DNS 200 could still be used for determining the address of the domain portion for the wv address.

Thus, the OLS 200 functionality may be executed at a number of different times. For example, the OLS 200 functionality may be executed by using a predetermined implementation or operator policy when the OLS 200 first receives the incoming messages; or during the OLS process when multiple alternatives are returned by the DNS or other location services; or run at the end as fallback mechanism when there is no appropriate response or no response at all from the DNS or other location services.

Figure 3:
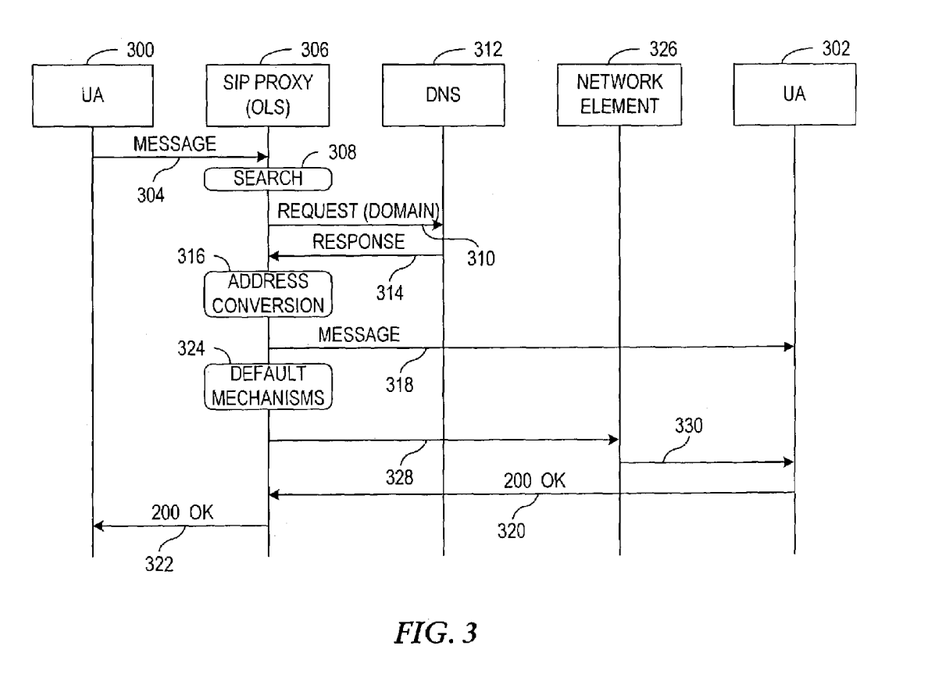
FIG. 3 is a message flow diagram illustrating one embodiment for managing multiple address schemes in incoming SIP messages in accordance with the present invention.

FIG. 3 is a message flow diagram illustrating one embodiment for managing multiple address schemes in incoming SIP messages in accordance with the present invention. In this example, a first SIP UA 300 wishes to send a general SIP request to another UA 302. The UA 300 sends the message 304 to the proxy 306 where, in the illustrated embodiment, the OLS functionality also resides. The OLS 306 first performs the search function 308, where the address scheme is determined and based on that scheme (and if no predefined OLS functionality is established for that scheme), the appropriate DNS query 310 using the domain name part is sent to the DNS 312. If the scheme is, for example, a "tel:" scheme or other such telephony address scheme, an ENUM extension may be used in connection with the query 310. It should be noted that the OLS logic can establish different location services to be used depending on the scheme. For example, "tel:"—>ENUM or TRIP; "sip:"—>DNS, etc. Further, the OLS logic may designate a predefined next hop if the operator specifies it, such as when receiving a "wv:", forward to WV Gateway. Other alternatives also exist when trying to locate the next hop, such as LDAP, whois, TRIP, etc.

If the DNS server 312 of the illustrated embodiment obtains the appropriate information in the response 314 to properly convert 316 the address into a routable address, then the proxy 306 can proceed with sending the message 318 to the UA 302. If successful, the UA 302 will return the appropriate response 320 (e.g., 200 OK) to the proxy 306, which in turn provides the response 322 to the UA 300.

In some embodiments, the DNS server 312 may respond 314 with multiple address schemes for the address scheme included in the DNS query 310. In such case, the address conversion 316 of the OLS 306 can issue multiple messages 318 using the different address schemes returned via the response 314, as is described more fully below.

However, the DNS server 312 (or other location/naming service) may not respond with enough information to allow for the proper address conversion 316, or may not respond at all. In this case, the OLS 306 includes the appropriate logic/functionality to instigate default mechanisms 324. The network element 326 represents any one or more elements that may be used in connection with such default mechanisms 324. For example, default configuration information may indicate to which network element 326 the message should be directed for proper handling. As a more particular example, if the incoming address scheme contained a telephony URI such as "tel:", the message may be forwarded 328 to a broker gateway such as a Breakout Gateway Control Function (BGCF), represented by network element 326. In this example, the BGCF 326 will map the message into SS7 assuming the end user associated with the UA 302 is located in the PSTN side. Alternatively, if the address scheme was "wv:", the message may be sent to a WV gateway (WV-GW) that will map the message into WV which will forward the message to the appropriate WV destination. Other schemes may be stored as an address of the appropriate gateway, such as "im:" and "pres:"—>IETF-GW. Other alternatives exist as well, such as querying other location servers such as a TRIP location server, local databases, other standard or proprietary services, etc. In any event, the message 330 may then be sent by the network element 326 to the UA 302, and the appropriate response 320, 322 is provided if successful.

Figure 4:
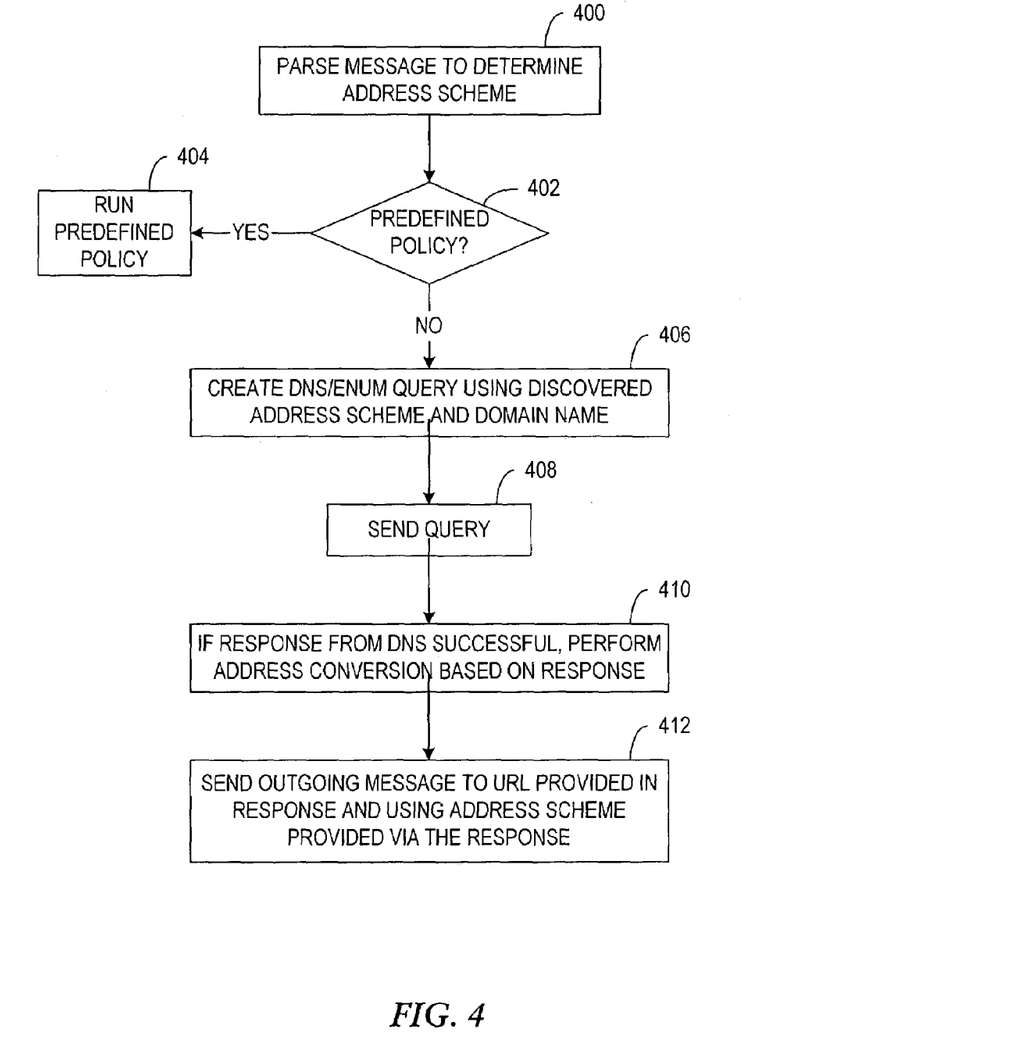
FIG. 4 is a flow diagram illustrating one manner in which OLS address conversion occurs where the location service or other domain information database provides a response including the requisite information to properly change the address scheme for outgoing messages.

FIG. 4 is a flow diagram illustrating one manner in which OLS address conversion occurs where the DNS, or other domain information database, provides a response including the requisite information to properly change the address scheme for outgoing messages. In this case, the message is parsed 400 to determine the address scheme. It is determined 402 whether a predefined policy is defined for this scheme. If so, the predefined policy is run 404; if not, a DNS query, DNS-based ENUM query, or other similar query is created 406 using the discovered address scheme and the domain name portion, and the query is sent 408 to the domain information database (e.g., DNS server). If the response from the DNS is successful in that it includes all of the necessary information to convert the message address scheme, the outgoing message address scheme is thus performed 410. An outgoing message is then sent 412 to the URL provided in the DNS response, using the address scheme provided via the DNS response.

The example of FIG. 4 assumes that the DNS responded, and responded with the information required to successfully convert the address scheme. However, this may not be the case. Rather, the DNS or other domain information database may return multiple address schemes. Further, the DNS may not return all of the requisite information, or may not respond at all. The flow diagrams of FIGS. 5A, 5B, and 6 illustrate exemplary embodiments of OLS functionality for handling such situations in accordance with the present invention based on OLS functionality.

Figure 5A:
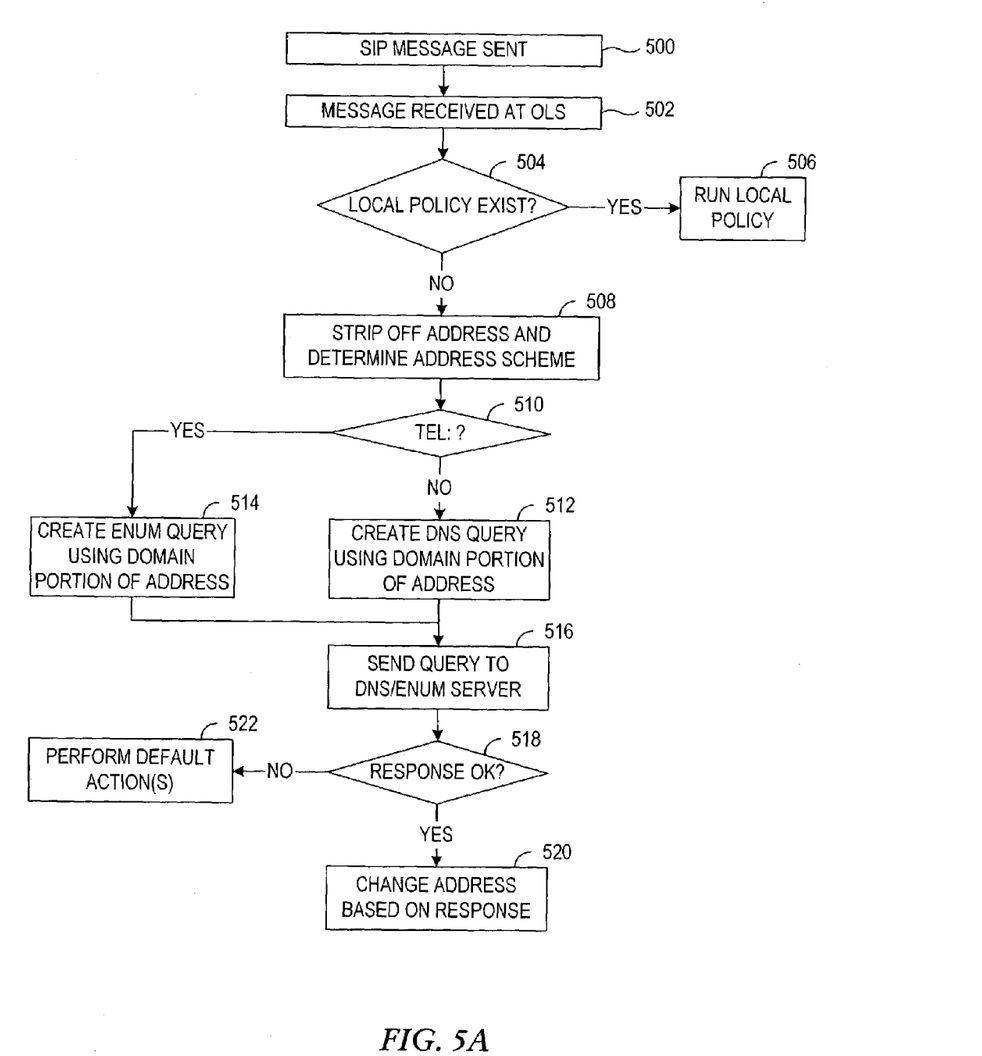
FIG. 5A is a flow diagram illustrating one embodiment in which the OLS functionality converts address schemes whether or not the location service provides the requisite information to properly convert the address scheme.
Figure 6:
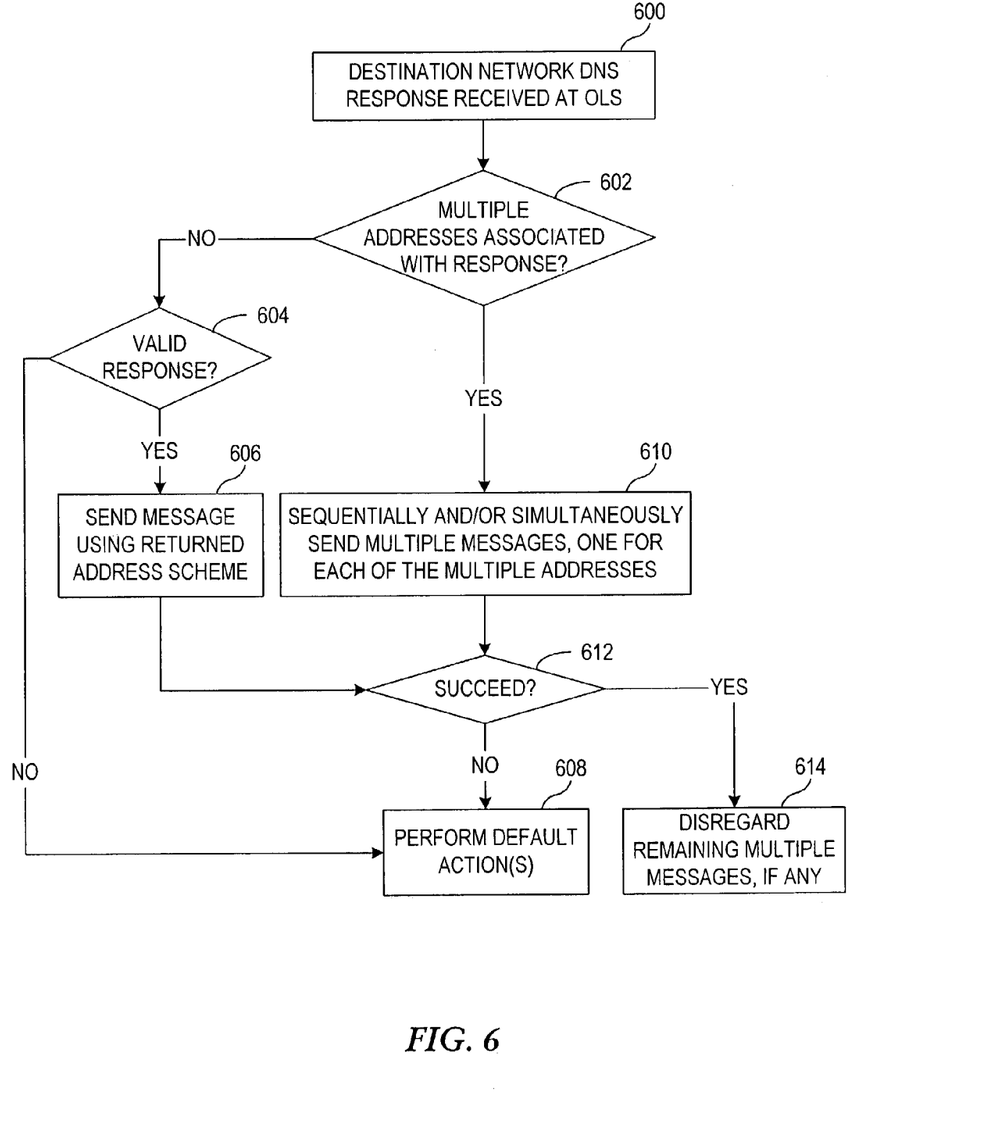
FIG. 6 is a flow diagram illustrating one embodiment in which the OLS functionality manages the receipt of multiple address schemes in the location server response.

FIG. 5A is a flow diagram illustrating one embodiment in which the OLS functionality converts address schemes whether or not the DNS provides the requisite information to properly convert the address scheme. In the illustrated embodiment, a SIP message is sent 500 by the source UA, and is received 502 at the OLS. In one embodiment, the OLS may be associated with servers such as a SIP proxy, S-CSCF, etc. In another embodiment, the OLS functionality is provided that the source terminal itself. The OLS may first optionally determine 504 whether a local policy exists in the network, and if so, the local policy may be run 506. For example, if the incoming address scheme is "wv:", then the local policy may indicate that the message should be forwarded to a local WV gateway.

If there is no controlling local policy, the OLS strips the address from the message and determines the address scheme as shown at block 508. In one embodiment, the particular address scheme may result in taking different actions. For example, it may be determined whether the address scheme is a telephony address scheme such as "fax:", "modem:", or "tel:" as shown at decision block 510 where predefined telephony servers or Gateways can be statically configured within the OLS logic. If not, a first action such as creating 512 a DNS query using the domain portion of the address may be performed. Otherwise, a second action such as creating 514 a DNS-based ENUM query using the domain portion of the address may be performed. The query is sent 516 to the appropriate DNS, ENUM, or other such server. If the response provides the requisite information as determined at decision block 518, the address may be changed 520 based on the information provided in the response. If, however, the response does not provide the requisite information, default actions are performed 522.

Figure 5B:
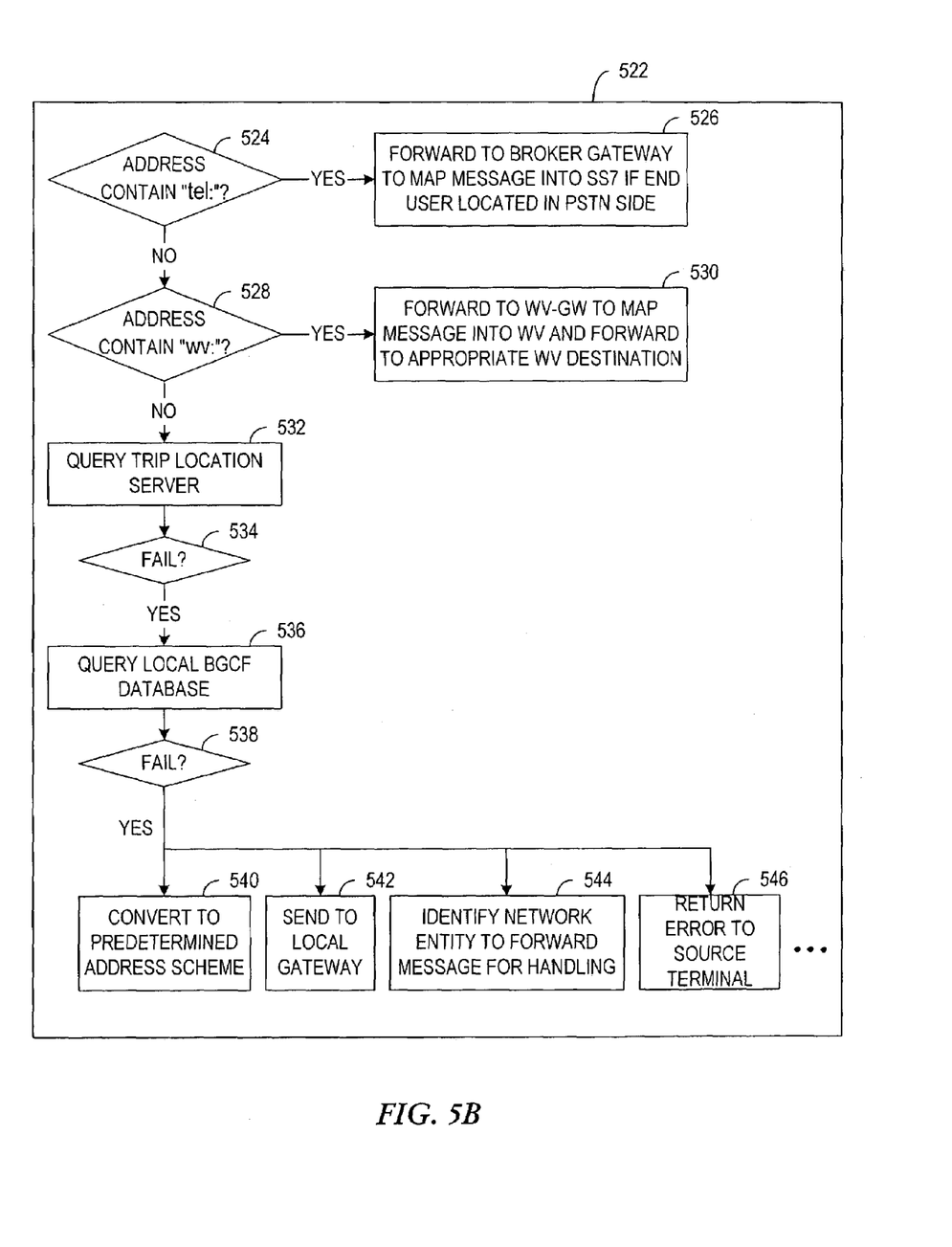
FIG. 5B illustrates an example of a default action that may be performed where the location server fails to respond with the requisite information to convert the address of the message to appropriately target the next hop.

FIG. 5B illustrates an example of a default action that may be performed where the DNS/ENUM server fails to respond with the requisite information to convert the address of the message to appropriately target the next hop. The example of FIG. 5B is provided for purposes of facilitating an understanding of the type of default actions that may occur. However, any desired one or more alternative actions may be associated with such default actions, and the invention is clearly not limited to the representative example of FIG. 5B. The various possible default actions of FIG. 5B may be performed in any desired order, or such attempts may be made partially or entirely in parallel. For purposes of discussion, a number of representative default actions in FIG. 5B are illustrated as sequential steps, although this need not be the case.

One particular default action may include determining whether the address contains a predetermined address scheme in which a predetermined action will be taken. For example, it may be determined 524 whether the address contains a telephony address scheme such as "tel:". If so, the message may be forwarded 526 to a broker gateway, such as a BGCF, that will map the message into SS7 if the end user is located in the PSTN side.

Otherwise, it may be determined 528 whether the address contains a "wv:" address scheme, and if so, the message may be forwarded 530 to a Wireless Village gateway (WV-GW) to map the message into WV and forward it to the appropriate WV destination. If such conditions are not met, additional or alternative default actions may be taken, such as querying 532 a TRIP location server, querying a local BGCF database 536, etc. If these actions fail 534, 538, still other default actions may be performed. Examples of such actions include converting 540 the address scheme to a predetermined address scheme, such as "sip:", sending 542 the message to a local gateway or otherwise identifying 544 a network entity in which to forward the message for handling, returning an error to the source terminal as shown at block 546, or the like.

As previously indicated, the DNS or other domain information database may return multiple address schemes. FIG. 6 is a flow diagram illustrating one embodiment in which the OLS functionality manages the receipt of multiple address schemes in the DNS response. This may occur, for example, when a protocol agnostic "im:" or "pres:" incoming address scheme is used, and the OLS queries the DNS server receives a response containing multiple alternatives with the same priority. For example, the DNS server may respond with "sip:" and "wv:" both having the same priority of "10." In such a case, the OLS determines which address scheme to use before forwarding the message to the destination network. As a more particular example, the OLS may determine whether to convert "im:" into "sip:" or "wv:" before forwarding the message to the destination network. This may be performed sequentially, in parallel, or using both sequential and parallel operations. One example is for the OLS to first convert "im:" to "sip:", and if this fails, convert "im:" to "wv" and try again.

FIG. 6 illustrates such a process. The destination network DNS response is received 600 at the OLS. It is determined 602 whether multiple address schemes are associated with the response. If not, only one valid response may have been received, or no valid responses may have been received. If one valid response was received as determined at decision block 604, the outgoing message is sent 606 using the DNS-returned address scheme. Otherwise, a default action(s) may be performed 608.

On the other hand, if multiple addresses were associated with the response as determined at decision block 602 (and there is no predefined logic/action matching one of those addresses), the OLS can sequentially and/or simultaneously send 610 multiple outgoing messages, one for each of the multiple addresses returned. If any one of these outgoing messages is successful as determined at decision block 612, no additional outgoing messages need to be sent, and any remaining multiple messages may therefore be disregarded 614. If none of the multiple outgoing messages is successful, one or more default actions may be performed 608, such as described in connection with FIG. 5B.

Figure 7:
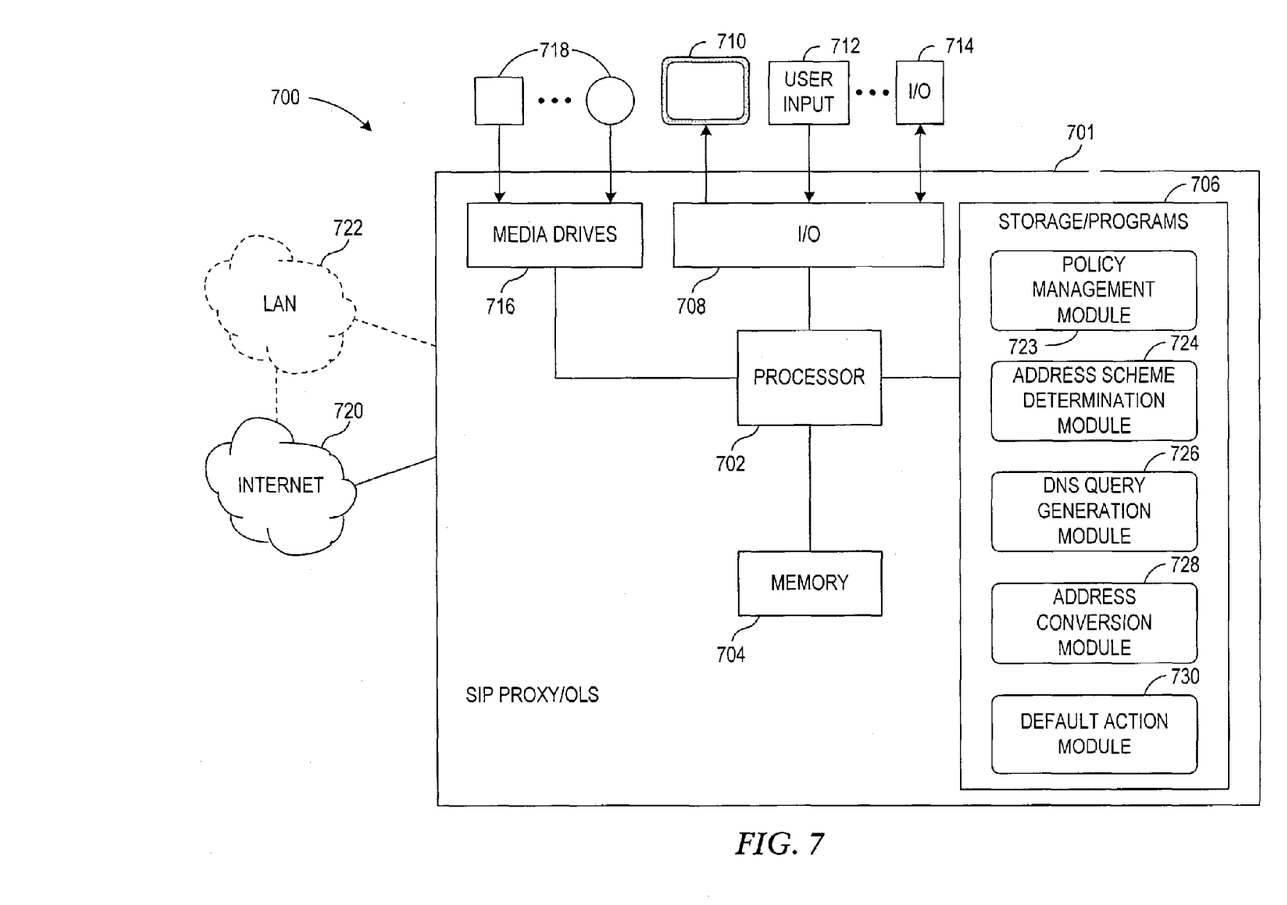
FIG. 7 illustrates a representative server computing system capable of carrying out operations in accordance with the present invention.

As previously indicated, the OLS may be implemented at a network server, such as at a SIP proxy, S-CSCF, etc. The network servers or other systems for providing address scheme conversion in accordance with the present invention may be any type of computing device capable of performing the OLS functions described herein. The OLS systems utilize computing systems to control and manage the address scheme conversion activity. Hardware, firmware, software or a combination thereof may be used to perform the various address adaptation functions and operations described herein. An example of a representative computing system capable of carrying out operations in accordance with the invention is illustrated in FIG. 7.

The example computing arrangement 700 suitable for performing the hop address scheme conversion activity in accordance with the present invention includes a server 701, which includes a central processor 702, which may be coupled to memory 704 and storage 706. In the illustrated embodiment, the server 701 represents a SIP proxy in which the OLS functionality resides. The processor 702 carries out a variety of functions as is known in the art, as dictated by software and/or firmware instructions. The storage 706 may represent firmware, hard-drive storage, etc. The storage 706 may also represent other types of storage media to store programs, such as programmable ROM (PROM), erasable PROM (EPROM), etc. The processor 702 may communicate with other internal and external components through input/output (I/O) circuitry 708. The proxy/OLS 701 may therefore be coupled to a display 710, which may be any type of known display or presentation screen such as LCD displays, plasma display, cathode ray tubes (CRT), etc. A user input interface 712 is provided, including one or more user interface mechanisms such as a mouse, keyboard, microphone, touch pad, touch screen, voice-recognition system, etc. Any other I/O devices 714 may be coupled to the proxy/OLS 701 as well.

The proxy/OLS 701 may also include one or more media drive devices 716, including hard and floppy disk drives, CD-ROM drives, DVD drives, and other hardware capable of reading and/or storing information. In one embodiment, software for carrying out the address scheme conversion operations in accordance with the present invention may be stored and distributed on CD-ROM, diskette or other form of media capable of portably storing information, as represented by media devices 718. These storage media may be inserted into, and read by, the media drive devices 716. Such software may also be transmitted to the proxy/OLS 701 via data signals, such as being downloaded electronically via a network, such as the Internet 720. The proxy/OLS 701 may be coupled to other computing devices, such as the landline and/or mobile terminals, via a network. The server may be, for example, coupled to a Local Area Network (LAN) 722 and/or may be part of a larger network configuration as in a global area network (GAN) such as the Internet 720, which allows ultimate connection to the various landline and/or mobile client devices.

In accordance with one embodiment of the invention, the storage 706, memory 704, and/or media devices 718 store the various programs and data used in connection with the present invention. In the illustrated embodiment of FIG. 7, the storage 706 is shown storing the various program modules, operable in connection with the processor 702. For example, the policy management module 723 is responsible for determining whether a local or operator policy exists and for carrying out that policy if applicable. The address scheme determination module 724 provides the functionality for identifying the address scheme of the incoming message. The DNS query generation module 726 is responsible for creating the DNS query using the domain part of the incoming address. Other similar modules may be provided in the case of ENUM queries or other analogous queries. Upon receipt of the response from the DNS (or other) server, the address conversion module 728 modifies the incoming address scheme to correspond to the address scheme indicated in the DNS response. The address conversion module 728 also manages the situation involving multiple address schemes returned by the DNS server, as described in connection with FIG. 6 above. The default action module 730 performs default actions as described in connection with FIGS. 5A and 5B, and may also include predetermined configuration data used in performing the default actions. It should be recognized that these programs and data may be stored in memory 704 or on other media 718 rather than being stored in the storage 706. The particular storage location is not relevant to the present invention.

In one embodiment of the invention, the policy management module 723 is further configured to apply a predefined addressing policy to the address scheme returned by the location services. This is meant for the case when, for example, the OLS sends the order to the location server to query about im:name@domain1.com. The location server may have DNS and LDAP, and may send two queries to each of them for obtaining the next hop address. Those two location services may return sip:name@domain1.com and aol:name@domain2.com. The location server delivers both responses to the OLS, which will apply the policy and will forward the sip:name@domain1.com to I-CSCF (for example) and the aol:name@domain2.com to the local AOL Gateway (for example). Thus, the policy can apply to the incoming message, but may also be applied to the responses received from the location services.

The computing arrangement 700 of FIG. 7 is provided as a representative example of a computing environment in which the principles of the present invention may be applied. From the description provided herein, those skilled in the art will appreciate that the present invention is equally applicable in a variety of other currently known and future mobile and landline computing environments. Thus, the present invention is applicable in any known computing structure where data may be communicated via a network.

Figure 8:
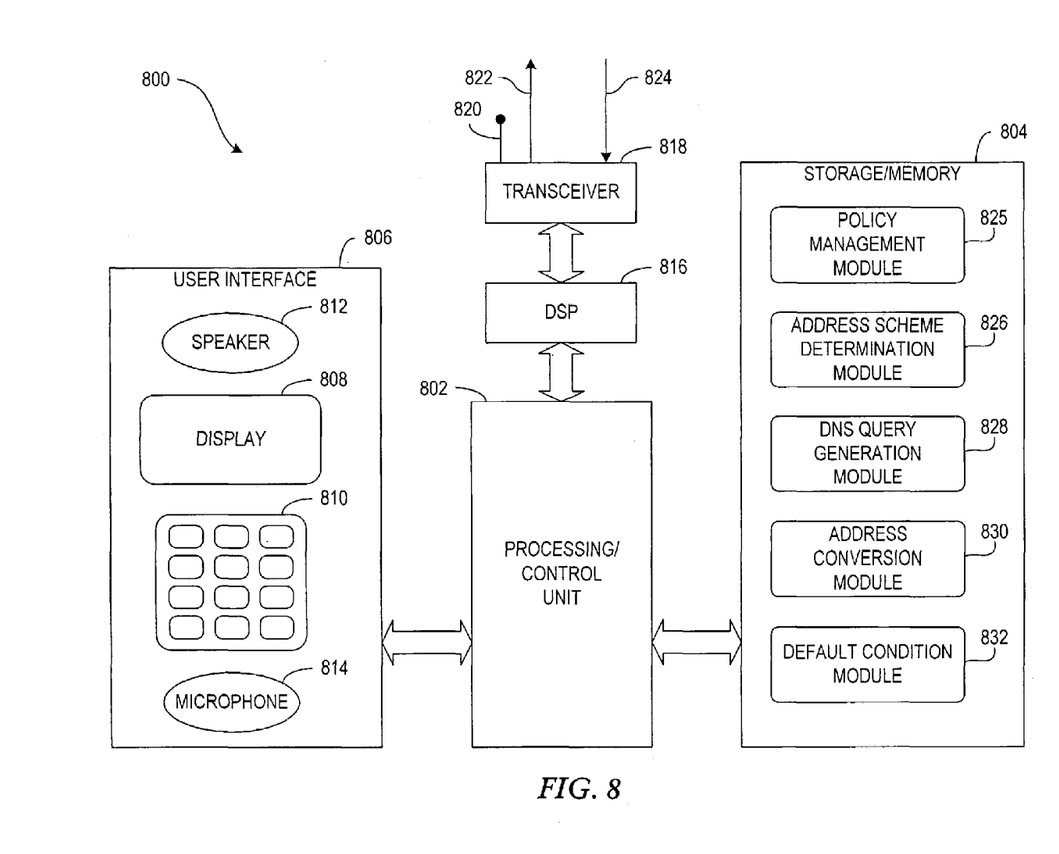
FIG. 8 illustrates a lightweight terminal-based solution capable of carrying out operations in accordance with the present invention.

For example, all or part of the address scheme adaptation functionality described herein may be implemented within the terminal itself. One such embodiment is depicted in FIG. 8, which illustrates a lightweight terminal-based solution. In this embodiment, some or all of the address scheme searching, query generation, address conversion, default action and other functionality occurs at the terminal.

In the illustrated embodiment, the terminal 800 is depicted as a wireless terminal, such as a mobile phone, PDA, etc. The mobile terminal 800 utilizes computing systems to control and manage the conventional device activity as well as the functionality provided by the present invention. Hardware, firmware, software or a combination thereof may be used to perform the functions and operations described herein. The representative mobile terminal 800 includes a computing system capable of carrying out operations in accordance with the invention. For example, the representative mobile terminal 800 includes a processing/control unit 802, such as a microprocessor, reduced instruction set computer (RISC), or other central processing module. The processing unit 802 need not be a single device, and may include one or more processors. For example, the processing unit may include a master processor and associated slave processors coupled to communicate with the master processor.

The processing unit 802 controls the basic functions of the mobile terminal 800 as dictated by programs available in the program storage/memory 804. The storage/memory 804 may include an operating system and various program and data modules associated with the present invention. In one embodiment of the invention, the programs are stored in non-volatile electrically-erasable, programmable read-only memory (EEPROM), flash ROM, etc. so that the programs are not lost upon power down of the mobile terminal. The storage 804 may also include one or more of other types of read-only memory (ROM) and programmable and/or erasable ROM, random access memory (RAM), subscriber interface module (SIM), wireless interface module (WIM), smart card, or other fixed or removable memory device. The relevant software for carrying out mobile terminal operations in accordance with the present invention may also be transmitted to the mobile terminal 800 via data signals, such as being downloaded electronically via one or more networks, such as the Internet and an intermediate wireless network(s).

For performing other standard mobile terminal functions, the processor 802 is also coupled to user-interface 806 associated with the mobile terminal 800. The user-interface (UI) 806 may include, for example, a display 808 such as a liquid crystal display, a keypad 810, speaker 812, and microphone 814. These and other UI components are coupled to the processor 802 as is known in the art. The keypad 810 may include alpha-numeric keys for performing a variety of functions, including dialing numbers and executing operations assigned to one or more keys. Other UI mechanisms may be employed, such as voice commands, switches, touch pad/screen, graphical user interface using a pointing device, trackball, joystick, or any other user interface mechanism.

The device 800, a wireless device as in the illustrated example, also includes conventional circuitry for performing wireless transmissions. The DSP 816 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 818, generally coupled to-an antenna 820, transmits the outgoing radio signals 822 and receives the incoming radio signals 824 associated with the mobile terminal 800.

In the illustrated embodiment, the storage/memory 804 stores the various programs and data used in connection with the present invention. For example, the storage 804 may include the policy management module 825, address scheme determination module 826, DNS query generation module 828, address conversion module 830, and default action module 832 as described in connection with FIG. 7. In one embodiment, some of the functionality may be provided via the SIP proxy, and other functionality provided at the terminal 800. For example, the SIP proxy or other server may perform the DNS query generation 828, which the terminal 800 provides the policy management module 825, address scheme determination module 826, address conversion module 830, and default action module 832.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/ communication links. From the description provided herein, those skilled in the art will be readily able to combine software created as described with appropriate general purpose or special purpose computer hardware to create a system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather defined by the claims appended hereto.

What is claimed is:

1. A method for performing next hop addressing for messages sent from source devices to destination devices over a network, the method comprising:
   receiving at least one incoming message from a source device targeted for a destination device and identifying an associated incoming address scheme of the incoming message;
   applying a predefined addressing policy to the incoming message if the predefined addressing policy includes a policy corresponding to the incoming address scheme; and
   if the predefined addressing policy does not include a policy for the incoming address scheme, dispatching one or more location queries to one or more location services, converting the incoming address scheme to one or more outgoing address schemes provided by the one or more location services in response to the location queries, and dispatching one or more outgoing messages using the outgoing address schemes provided by the location services.

2. The method of claim 1, further comprising effecting a default operation where the location services fail to provide information capable of converting the incoming address scheme to the outgoing address scheme.

3. The method of claim 2, wherein effecting the default operation comprises effecting the default operation selected from a plurality of default operations depending on the incoming address scheme of the incoming message.

4. The method of claim 3, wherein effecting the default operation depending on the incoming address scheme of the incoming message comprises forwarding the incoming message to a network element selected in response to the incoming address scheme of the incoming message.

5. The method of claim 2, wherein effecting the default operation comprises querying a different location service than a location service originally queried.

6. The method of claim 2, wherein effecting the default operation comprises converting the incoming address scheme to a predetermined outgoing address scheme.

7. The method of claim 2, wherein effecting the default operation comprises forwarding the incoming message to a predefined local gateway.

8. The method of claim 2, wherein effecting the default operation comprises identifying a network entity in which to forward the incoming message for handing, and forwarding the incoming message to the identified network entity.

9. The method of claim 2, wherein effecting the default operation comprises returning an error message to the source device.

10. The method of claim 1, wherein dispatching the one or more location queries to the one or more location services comprises dispatching at least a domain of an address of the incoming message.

11. The method of claim 10, further comprising effecting the default operation where no address information for the domain is received in response to the dispatching of the one or more outgoing messages.

12. The method of claim 1, wherein:
   the location services provide a plurality of the one or more outgoing address schemes in response to the location queries;
   converting the incoming address scheme to the one or more outgoing address schemes comprises creating a plurality of the one or more outgoing messages using each of the plurality of the one or more outgoing address schemes provided by the location services; and
   dispatching the one or more outgoing messages comprises concurrently dispatching the plurality of the one or more outgoing messages to one or more destinations provided by the location services in response to the location queries.

13. The method of claim 12, if no successful acknowledgement is received from the destination devices, further comprising effecting a default operation to further process the incoming message.

14. The method of claim 1, wherein:
   the location services provide a plurality of the one or more outgoing address schemes in response to the location queries;
   converting the incoming address scheme to the one or more outgoing address schemes comprises creating an outgoing message using one of the outgoing address schemes provided by the location services;
   dispatching the one or more outgoing messages comprises dispatching the created outgoing message to a destination provided by the location services; and
   repeating the creating and dispatching of the outgoing messages until a successful acknowledgement is received from the destination device, or until the outgoing address schemes have been exhausted.

15. The method of claim 14, if the outgoing address schemes have been exhausted without the location services providing information capable of converting the incoming address scheme to the one or more outgoing address schemes, the method further comprising effecting a default operation to further process the incoming message.

16. The method of claim 1, wherein:
   the location services provide a plurality of the one or more outgoing address schemes in response to the location queries;
   converting the incoming address scheme to the one or more outgoing address schemes comprises creating outgoing messages using the outgoing address schemes provided by the location services; and
   dispatching the one or more outgoing messages comprises dispatching at least some of the created outgoing messages in sequence and dispatching at least some of the created outgoing messages concurrently.

17. The method of claim 1, wherein applying the predefined policies comprises effecting a predefined operator policy or predefined local policy in lieu of querying the location services, and forwarding the incoming message to a network element depending on the incoming address scheme.

18. The method of claim 1, wherein the network comprises a Session Initiation Protocol (SIP)-enabled network, and wherein the incoming messages comprise SIP messages.

19. The method of claim 1, wherein the location services comprises at least one of a Domain Name Service (DNS), a DNS-enabled ENUM service, Telephony Routing over IP (TRIP) service, a whois service, a Lightweight Directory Access Protocol (LDAP) service, and proprietary location services based on directory or database mechanisms.

20. The method of claim 1, wherein identifying the associated incoming address scheme of the incoming message comprises parsing an address associated with the incoming message to identify the associated incoming address scheme.

21. A method for performing next hop addressing for Session Initiation Protocol (SIP) messages sent from source devices to destination devices over a SIP-enabled network, comprising:
applying a predefined addressing policy to an incoming SIP message if the predefined addressing policy includes a policy corresponding to an incoming address scheme;
converting the incoming address scheme to multiple outgoing address schemes provided by a location service in response to a location query;
dispatching a plurality of outgoing messages each using one of the outgoing address schemes provided by the location service; and
effecting a default next hop addressing operation when the predefined addressing policy does not correspond to the incoming address and when none of the multiple outgoing address schemes provides a successful result.

22. The method of claim 21, wherein the successful result comprises receiving a response from the location service including information capable of converting the incoming address scheme to the outgoing address scheme.

23. The method of claim 21, wherein the successful result comprises receiving a successful acknowledgement of the SIP message by the destination device.

24. The method of claim 21, wherein dispatching the plurality of outgoing messages comprises substantially sequentially dispatching each of the plurality of outgoing messages to the destination device.

25. The method of claim 21, wherein dispatching the plurality of outgoing messages comprises substantially concurrently dispatching all of the plurality of outgoing messages to the destination device.

26. An optimal location server for use in determining next hop addresses for messages transmitted over a network using a data session negotiation protocol, the optimal location server comprising:
an address scheme determination module configured to parse an incoming address scheme from an address contained within an incoming message;
a policy management module configured to apply a predefined addressing policy to the incoming message if the predefined addressing policy includes a policy corresponding to the incoming address scheme;
a location service query generation module configured to create and dispatch a location query to a location service;
an address conversion module configured to convert the incoming address scheme to one or more outgoing address schemes provided by the location service in response to the location query and to generate outgoing messages for each respective outgoing address scheme; and
a default action module configured to effect a fallback next hop addressing operation when neither the policy management module nor the address conversion module successfully provide a next hop address for the incoming message.

27. The optimal location server as in claim 26, wherein the default action module is further configured to effect the fallback next hop addressing operation by selecting the fallback next hop addressing operation from a plurality of fallback next hop addressing operations depending on the incoming address scheme of the incoming message.

28. The optimal location server as in claim 26, wherein the default action module is further configured to effect the fallback next hop addressing operation by performing any one or more of querying a different location service than a location service originally queried, converting the incoming address scheme to a predetermined outgoing address scheme; forwarding the incoming message to a predefined network gateway, and returning an error message to a source device that provided the incoming message.

29. The optimal location server as in claim 26, wherein the location service provides a plurality of the one or more outgoing address schemes in response to the location query, and wherein the address conversion module is further configured to convert the incoming address scheme to the plurality of the one or more outgoing address schemes by creating a plurality of the outgoing messages using each of the plurality of the one or more outgoing address schemes provided by the location service, and to generate the plurality of outgoing messages for either concurrent or sequential dispatch to one or more destinations provided by the location service in response to the location query.

30. The optimal location server as in claim 26, wherein the data session negotiation protocol comprises a Session Initiation Protocol (SIP) and the network comprises a SIP-enabled network.

31. The optimal location server as in claim 30, further comprising a SIP proxy, wherein the optimal location server is implemented at the SIP proxy.

32. The optimal location server as in claim 30, further comprising a S-CSCF, wherein the optimal location server is implemented at the S-CSCF.

33. A terminal for transmitting messages over a network using Session Initiation Protocol (SIP), the terminal including an optimal location service for use in determining next hop addresses for the messages to be transmitted, the optimal location service comprising:
an address scheme determination module configured to identify a message address scheme from an address contained within a message to be transmitted;
a policy management module configured to apply a predefined addressing policy to the message if the predefined addressing policy includes a policy corresponding to the message address scheme;
an address conversion module configured to convert the message address scheme to one or more outgoing address schemes provided by a location service in response to a SIP proxy location query, and to generate outgoing messages for each respective outgoing address scheme; and
a default action module configured to effect a default next hop addressing operation when neither the policy management module nor the address conversion module successfully provide a next hop address for the message to be transmitted.

34. A computer-readable medium having instructions stored thereon which are executable by a computer system for performing next hop addressing for messages sent from source devices to destination devices over a network by performing steps comprising:

applying a predefined addressing policy to an incoming message if the predefined addressing policy includes a policy corresponding to an incoming address scheme;

converting the incoming address scheme to multiple outgoing address schemes provided by a location service in response to a location query;

dispatching a plurality of outgoing messages each using one of the outgoing address schemes provided by the location service; and     effecting a default next hop addressing operation when the predefined addressing policy does not correspond to the incoming address and when none of the multiple outgoing address schemes provides a next hop address for the incoming message.

35. An optimal location system operable on a network, comprising:

a location server for querying multiple location services to return next hop addresses and corresponding next hop address schemes in response to receipt of a location service query;

an optimal location server for use in determining the next hop address for a message to be transmitted over the network using a data session negotiation protocol, the optimal location server comprising:

an address scheme determination module configured to parse an incoming address scheme from an address contained within an incoming message;

a policy management module configured to apply a predefined addressing policy to the incoming message if the predefined addressing policy includes a policy corresponding to the incoming address scheme;

a location service query generation module configured to create and dispatch the location query to the location server for querying the multiple location services;

an address conversion module configured to convert the incoming address scheme to one or more outgoing address schemes provided by the location server in response to the location query and to generate outgoing messages for each respective outgoing address scheme; and     a default action module configured to effect a fallback next hop addressing operation when neither the policy management module nor the address conversion module successfully provide a next hop address for the incoming message.

36. The optimal location system as in claim 35, wherein the location services comprise at least one of a Domain Name Server (DNS), a DNS-enabled ENUM server, Telephony Routing over IP (TRIP) server, a whois server, and a Lightweight Directory Access Protocol (LDAP) server.

37. The optimal location system as in claim 35, wherein the data session negotiation protocol comprises a Session Initiation Protocol (SIP) and the network comprises a SIP-enabled network.

38. The optimal location system as in claim 35, wherein the policy management module is further configured to apply a predefined addressing policy to the address schemes returned by the location services.

\* \* \* \* \*